United States Patent
Nagura

(10) Patent No.: US 12,549,275 B2
(45) Date of Patent: Feb. 10, 2026

(54) COMMUNICATION SYSTEM

(71) Applicant: SUBARU CORPORATION, Tokyo (JP)

(72) Inventor: Tatsunori Nagura, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 17 days.

(21) Appl. No.: 18/591,074

(22) Filed: Feb. 29, 2024

(65) Prior Publication Data

US 2024/0313883 A1    Sep. 19, 2024

(30) Foreign Application Priority Data

Mar. 15, 2023    (JP) ................................. 2023-040813

(51) Int. Cl.
    *H04L 1/00*      (2006.01)

(52) U.S. Cl.
    CPC ................................. *H04L 1/0008* (2013.01)

(58) Field of Classification Search
    CPC ......... H04L 1/0008; H04L 1/08; H04L 67/12; B60R 16/023
    See application file for complete search history.

(56) References Cited

U.S. PATENT DOCUMENTS

| | | | | |
|---|---|---|---|---|
| 6,195,602 | B1 * | 2/2001 | Hazama | G07C 5/008 |
| | | | | 701/29.6 |
| 10,992,688 | B2 * | 4/2021 | Kishikawa | H04L 12/28 |
| 2014/0334300 | A1 * | 11/2014 | Horihata | H04L 47/12 |
| | | | | 370/230 |
| 2015/0355917 | A1 * | 12/2015 | Tsujimura | H04L 12/40006 |
| | | | | 710/104 |
| 2016/0297401 | A1 * | 10/2016 | Haga | H04L 9/0891 |
| 2017/0118038 | A1 * | 4/2017 | Ujiie | H04B 1/3822 |
| 2017/0353302 | A1 * | 12/2017 | Fernandez | H04L 9/14 |
| 2018/0229739 | A1 * | 8/2018 | Imamoto | H04W 4/48 |
| 2018/0234248 | A1 * | 8/2018 | Imamoto | H04L 63/0428 |
| 2020/0244442 | A1 * | 7/2020 | Zeh | H04L 9/3242 |

(Continued)

FOREIGN PATENT DOCUMENTS

JP      2020-167573 A      10/2020

*Primary Examiner* — Albert Decady
*Assistant Examiner* — Osman M Alshack
(74) *Attorney, Agent, or Firm* — TROUTMAN PEPPER LOCKE LLP

(57) ABSTRACT

A communication system includes a target unit provided in a vehicle and including at least one target unit processor and at least one target unit memory coupled to each other; and a communication tool coupled to the target unit for bidirectional communication and including at least one communication tool processor and at least one communication tool memory coupled to each other. The communication tool processor transmits certain information including first certain data and a first padding value to the target unit. The target unit processor determines whether the first padding value matches a preset specific padding value, and transmits abnormality information to the communication tool when the first padding value does not match the specific padding value. Upon receiving the abnormality information, the communication tool processor transmits the certain information including the first certain data and a second padding value different from the first padding value to the target unit.

10 Claims, 5 Drawing Sheets

(56) References Cited

U.S. PATENT DOCUMENTS

2021/0157902 A1\* 5/2021 Sakurai ................. G06F 3/0604
2021/0255805 A1\* 8/2021 Harata ...................... G06F 8/65
2023/0291647 A1\* 9/2023 Yamasaki ........... H04L 41/0663

\* cited by examiner

FIG. 3

| ORDER OF PRIORITY | PADDING VALUE CANDIDATES |
|---|---|
| 1 | 00 |
| 2 | 05 |
| 3 | 0A |
| 4 | 0F |
| 5 | 50 |
| 6 | 55 |
| 7 | 5A |
| 8 | 5F |
| 9 | A0 |
| 10 | A5 |
| 11 | AA |
| 12 | AF |
| 13 | F0 |
| 14 | F5 |
| 15 | FA |
| 16 | FF |
| ⋮ | ⋮ |

COMMUNICATION SYSTEM

CROSS-REFERENCE TO RELATED APPLICATION

The present application claims priority from Japanese Patent Application No. 2023-040813 filed on Mar. 15, 2023, the entire contents of which are hereby incorporated by reference.

BACKGROUND

The disclosure relates to a communication system.

Japanese Unexamined Patent Application Publication (JP-A) No. 2020-167573 discloses a technique of coupling an external device to a vehicle to update programs of various electronic devices provided in the vehicle or to diagnose malfunctions in various electronic devices provided in the vehicle.

SUMMARY

An aspect of the disclosure provides a communication system. The communication system includes a target unit and a communication tool. The target unit is provided in a vehicle and includes one or more target unit processors and one or more target unit memories coupled to the one or more target unit processors. The communication tool is coupled to the target unit so as to enable bidirectional communication, the communication tool including one or more communication tool processors and one or more communication tool memories coupled to the one or more communication tool processors. The one or more communication tool processors are configured to execute a process including transmitting certain information including first certain data and a first padding value to the target unit. The one or more target unit processors are configured to execute a process including: determining whether the first padding value included in the received certain information matches a specific padding value preset in the one or more target unit processors; and transmitting abnormality information to the communication tool in a case where it is determined that the first padding value does not match the specific padding value. The one or more communication tool processors are configured to execute a process including, upon receiving the abnormality information, transmitting the certain information including the first certain data and a second padding value different from the first padding value to the target unit.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

FIG. 3 is a diagram for describing a padding value candidate priority order table according to the embodiment of the disclosure;

DETAILED DESCRIPTION

Conventionally, when transmitting desired communication data from an external device coupled to a vehicle to various electronic devices installed in the vehicle, the external device may transmit the communication data divided in predetermined blocks.

The size of the above-mentioned communication data is variable depending on its type. Thus, the last block to be transmitted often includes a fraction. This results in unused space within the last block to be transmitted.

The external device usually executes a padding process that fills the unused space with a meaningless numerical value and transmits the communication data. The numerical value in the padding process is usually determined in advance in a communication network.

However, there can be a discrepancy (inconsistency) in the padding value between the transmitting side (the external device coupled to the vehicle) and the receiving side (various electronic devices installed in the vehicle) due to differences in design specifications, designers, design timing, etc. In this case, the receiving side (various electronic devices installed in the vehicle) may determine that there is a communication malfunction and stop or interrupt the communication. If the communication is stopped or interrupted in this way, a desired function update or a malfunction diagnosis may not be performed, reducing the user's convenience.

It is desirable to provide a communication system capable of suppressing a decrease in convenience.

An embodiment of the disclosure will be described in detail below with reference to the accompanying drawings. Specific dimensions, materials, numerical values, etc. indicated in the embodiment are merely examples for facilitating the understanding of the disclosure and are not intended to limit the disclosure unless otherwise noted. In the present specification and the drawings, for elements having substantially the same functions and configurations, overlapping descriptions are omitted by denoting them with the same symbols, and elements not directly related to the disclosure are omitted from the illustrations.

Figure 1:
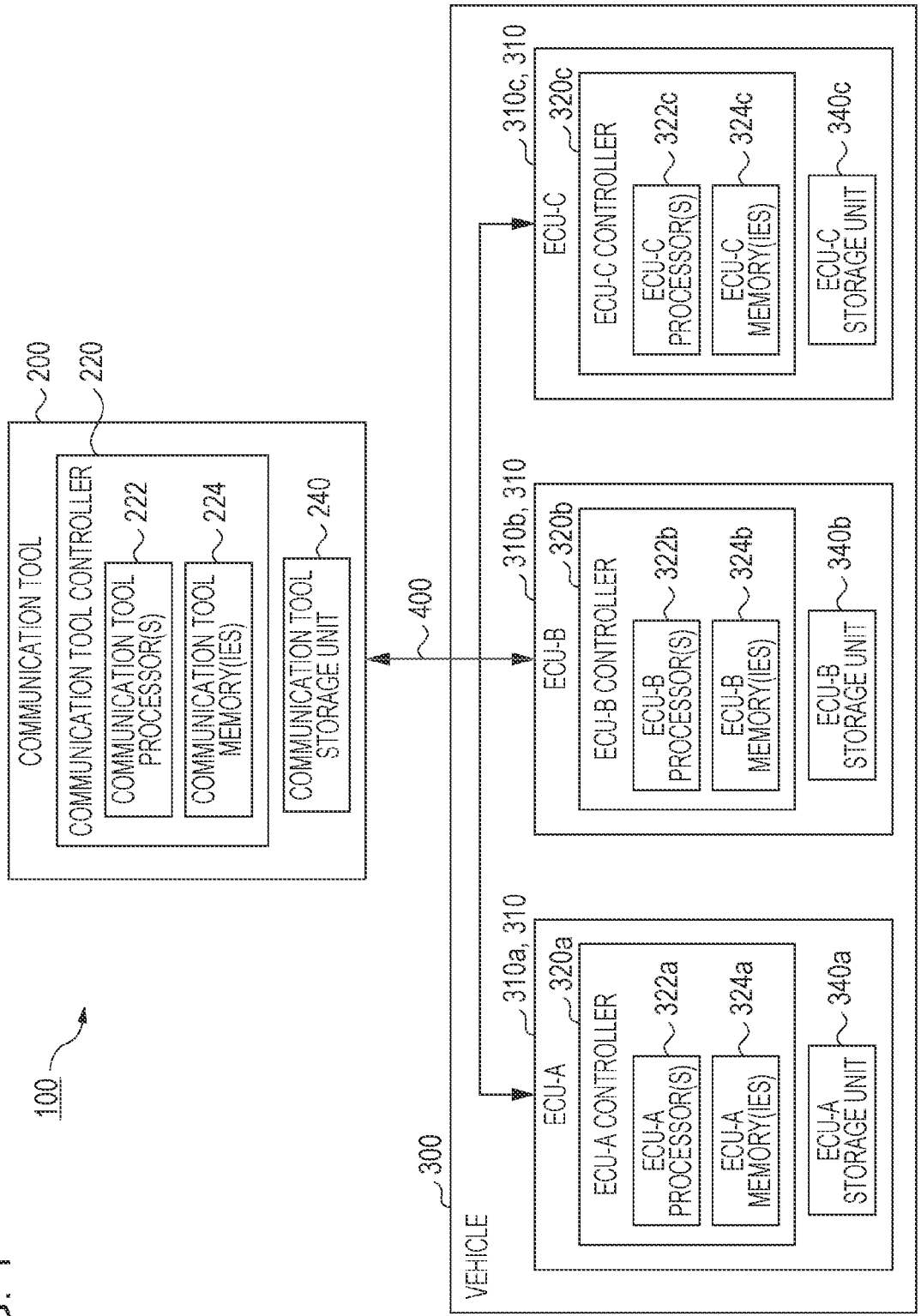
FIG. 1 is a functional block diagram for describing a communication system according to an embodiment of the disclosure.

FIG. 1 is a functional block diagram for describing a communication system 100 according to the present embodiment. As illustrated in FIG. 1, the communication system 100 includes a communication tool 200 and a vehicle 300. Note that the vehicle 300 is, for example, a hybrid vehicle equipped with an engine and a motor as driving power sources.

The vehicle 300 includes multiple target units (electronic control unit (ECU)-A 310a, ECU-B 310b, and ECU-C 310c). Hereinafter, any one of the ECU-A 310a, ECU-B 310b, ECU-C 310c may be abstractly referred to as a target unit 310. These target units 310 are coupled to each other to enable bidirectional communication. Although the case where three target units 310, namely, ECU-A 310a, ECU-B 310b, and ECU-C 310c, are provided is discussed in the present embodiment, the number of target units 310 is not limited thereto. That is, the target units 310 may be as many as one or more.

Note that these target units 310 may be control units of various electronic devices installed in the vehicle 300. In one example, one target unit 310 is, for example, an engine controller configured to control an engine. Another target unit 310 is, for example, a motor controller configured to control a motor. Another target unit 310 is, for example, a battery controller configured to control a battery. Another target unit 310 is, for example, a wireless communication unit configured to communicate wirelessly with a data center external to the vehicle 300. Another target unit 310 is, for example, a car navigation system controller configured to control a car navigation system. Another target unit 310 is, for example, an autonomous driving controller configured to control autonomous driving of the vehicle 300.

As illustrated in FIG. 1, the communication tool 200 includes a communication tool controller 220 and a communication tool storage unit 240. Note that the communication tool 200 is, for example, a dedicated terminal such as a malfunction diagnosis device for diagnosing a malfunction in the vehicle 300. Alternatively, the communication tool 200 is, for example, a dedicated terminal such as a reprogramming device for updating a desired function of the vehicle 300. Alternatively, the communication tool 200 is, for example, a personal computer or the like.

The communication tool controller 220 includes one or more communication tool processors 222 and one or more communication tool memories 224 coupled to the communication tool processor (s) 222. Each communication tool processor 222 includes, for example, a central processing unit (CPU). Each communication tool memory 224 includes, for example, read-only memory (ROM), random access memory (RAM), etc. The ROM is a storage element that stores programs and operational parameters used by the CPU. The RAM is a storage element that temporarily stores data such as variables and parameters used for processing executed by the CPU.

In addition, the communication tool storage unit 240 may include ROM, RAM, etc., and may have substantially the same functionality as the communication tool memory (s) 224. Also, a padding value table is stored in the communication tool storage unit 240.

As described below, the communication tool 200 transmits communication data to the target units 310 (ECU-A 310a, ECU-B 310b, and ECU-C 310c). The size of the communication data is variable depending on the type. Thus, the last block to be transmitted in the communication data may include a fraction. This results in unused space within the last block to be transmitted. The communication tool 200 usually executes a padding process that fills the unused space with a meaningless numerical value. Here, the numerical value attached in the padding process is referred to as a padding value. In the padding value table stored in the communication tool storage unit 240, the padding values corresponding to the respective target units 310 (ECU-A 310a, ECU-B 310b, and ECU-C 310c) are preset. Note that the padding values corresponding to the respective target units 310 (ECU-A 310a, ECU-B 310b, and ECU-C 310c) may be different or may be the same.

Also, as illustrated in FIG. 1, the ECU-A 310a includes an ECU-A controller 320a and an ECU-A storage unit 340a. Similarly, the ECU-B 310b includes an ECU-B controller 320b and an ECU-B storage unit 340b. Moreover, the ECU-C 310c includes an ECU-C controller 320c and an ECU-C storage unit 340c.

The ECU-A controller 320a includes one or more ECU-A processors 322a and one or more ECU-A memories 324a coupled to the ECU-A processor (s) 322a. Similarly, the ECU-B controller 320b includes one or more ECU-B processors 322b and one or more ECU-B memories 324b coupled to the ECU-B processor (s) 322b. Moreover, the ECU-C controller 320c includes one or more ECU-C processors 322c and one or more ECU-C memories 324c coupled to the ECU-C processor (s) 322c.

The ECU-A processor (s) 322a, ECU-B processor (s) 322b, and ECU-C processor (s) 322c each include, for example, a CPU.

Also, the ECU-A memory (ies) 324a, ECU-B memory (ies) 324b, and ECU-C memory (ies) 324c each include, for example, ROM, RAM, etc.

Moreover, the ECU-A storage unit 340a, ECU-B storage unit 340b, and ECU-C storage unit 340c each include ROM, RAM, etc. The ECU-A storage unit 340a, ECU-B storage unit 340b, and ECU-C storage unit 340c may also have substantially the same functionality as the ECU-A memory (ies) 324a, ECU-B memory (ies) 324b, and ECU-C memory (ies) 324c. In addition, the individual storage units (ECU-A storage unit 340a, ECU-B storage unit 340b, and ECU-C storage unit 340c) store specific padding values that are preset for the respective target units 310 (ECU-A 310a, ECU-B 310b, and ECU-C 310c). Note that the specific padding values of the respective target units 310 (ECU-A 310a, ECU-B 310b, and ECU-C 310c) may be different or may be the same.

As illustrated in FIG. 1, the communication tool 200 is coupled to the vehicle 300. The communication tool 200 is then coupled to the target units 310 (ECU-A 310a, ECU-B 310b, and ECU-C 310c) to enable bidirectional communication. Note that the communication tool 200 may be coupled by wire to the vehicle 300. Alternatively, the communication tool 200 may be wirelessly coupled to the vehicle 300.

The communication tool 200 and the target units 310 (ECU-A 310a, ECU-B 310b, and ECU-C 310c) are coupled by, for example, a controller area network (CAN) 400 to perform communication. The ECU-A processor (s) 322a, ECU-B processor (s) 322b, and ECU-C processor (s) 322c are also coupled by, for example, the CAN 400 to perform communication.

Figure 2A:
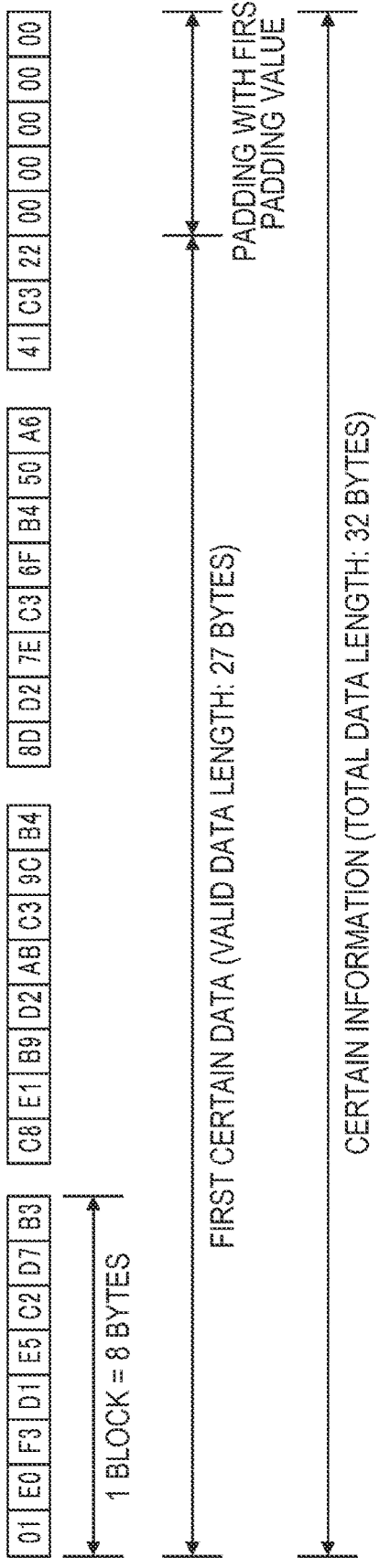
FIGS. 2A and 2B are diagrams for describing certain information according to the embodiment of the disclosure.
Figure 2B:
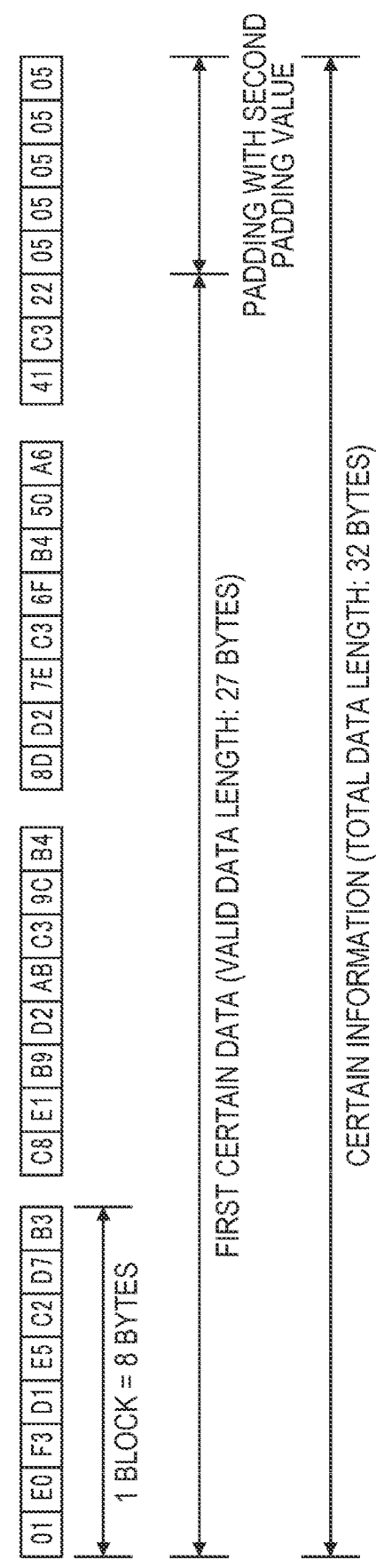

FIGS. 2A and 2B are diagrams for describing certain information according to the embodiment of the disclosure. Hereinafter, the case in which the communication tool 200 is coupled to the vehicle 300 to execute an update of a program of any of the target units 310 or to conduct a diagnosis of a malfunction will be discussed. In this case, the communication tool 200 executes transmission of desired communication data to the target unit 310. At this time, as illustrated in FIG. 2A, the communication tool 200 generates certain information. The certain information includes non-illustrated header information, first certain data, and a first padding value.

The first certain data is data that, for desired communication data to be transmitted from the communication tool 200 to the ECU-A 310a, 32 bytes are divided into blocks, each consisting of 8 bytes.

The communication tool 200 then executes a padding process to fill the unused space within the last block to be transmitted with the first padding value. At this time, the communication tool 200 refers to the padding value table stored in the communication tool storage unit 240 and executes the above-mentioned padding process using the padding value corresponding to the target unit 310 to be communicated with as the first padding value.

Also, the non-illustrated header information includes total data length information indicating a total data length (fixed as 32 bytes in the present embodiment), which is the length of total data. The header information also includes valid data length information indicating a valid data length (27 bytes in the case of FIG. 2A), which is the length of valid data.

The communication tool 200 then transmits the generated certain information to the target unit 310 to be communicated with. At this time, the communication tool 200 waits until a preset certain time elapses after transmitting the certain information.

On receipt of the certain information from the communication tool 200, the target unit 310 checks the padding value included in the received certain information. In one example, the target unit 310 refers to the header information included in the certain information to check the total data length information and the valid data length information. The target unit 310 then identifies, based on the total data length information and the valid data length information, the padding value included in an area corresponding to the difference between the total data and the valid data in the received certain information. Alternatively, the last numerical value of the total data may be regarded as the padding value, and, taking into consideration the continuity of the padding value, data before the location where the padding value is interrupted may be regarded as valid data. That is, the padding value and the valid data length may be identified without using the valid data length information included in the header information.

The target unit 310 then determines whether the padding value checked as described above is different from the specific padding value stored in its storage unit. As a result, if the specific padding value stored in its storage unit and the padding value checked as described above are different, the target unit 310 transmits abnormality information indicating that the padding value included in the certain information is incorrect to the communication tool 200.

Then, when a preset certain time elapses after transmitting the certain information, the communication tool 200 determines whether abnormality information has been received from the target unit 310. As a result, if abnormality information has been received, the communication tool 200 determines that the padding value set in the padding value table stored in the communication tool storage unit 240 is incorrect. Then, as illustrated in FIG. 2B, the communication tool 200 changes the padding value to a second padding value that is different from the first padding value, and executes the above-mentioned padding process to regenerate certain information. That is, in this case, the regenerated certain information will include the non-illustrated header information, the first certain data, and the second padding value.

On receipt of abnormality information again, the communication tool 200 repeats the operation of making the padding value different and transmitting communication data again. Then, until abnormality information is no longer received from the target unit 310, the communication tool 200 systematically attempts all padding values, that is, sequentially references values that have not been transmitted until the previous transmission, to detect the correct value. Accordingly, it is possible to suppress the risk that the user's convenience will be reduced because a desired function update or a malfunction diagnosis cannot be performed.

Note that the padding value is composed of 1 byte, so the total number is 256 types. Also, if the case in which no padding value is set (there is no padding value) is taken into consideration, the total number of all possible options is 257 types. In the case where no padding value is set, the length of data indicated by the valid data length information included in the header information matches the length of data indicated by the total data length information.

At this time, if the communication tool 200 attempts all padding values non-systematically, the time until the correct padding value is detected may be prolonged. Accordingly, in the present embodiment, a padding value candidate priority order table, which defines the order of priority when attempting all padding values until abnormality information is no longer received from the target unit 310, is stored in the communication tool storage unit 240 of the communication tool 200. Here, the order of priority indicates the descending order of being likely to be set as the padding value, or the descending order of being frequently used as the padding value.

FIG. 3 is a diagram for describing the padding value candidate priority order table according to the embodiment of the disclosure. As illustrated in FIG. 3, the padding value candidate priority order table defines the order of priority of candidate values for the padding value (hereinafter referred to as padding value candidates) to be used when attempting all padding values.

For example, "0" and "F" have a 4-bit continuity, and "5" and "A" have identifiers of 0101 and 1010. Therefore, padding values generally use numerical values such as "0", "5", "A", and "F". Accordingly, in the padding value candidate priority order table, the priority of padding value candidates that combine these values is set to be high. That is, as described above, because it is assumed that the frequency of use of "0", "5", "A", and "F" is high, the frequency of use of the combinations of "0", "5", "A", and "F" is also assumed to be high.

By setting the order of priority of padding value candidates in this way, it is possible to shorten the time until the correct padding value is detected. However, the padding value candidate priority order table illustrated in FIG. 3 is merely one example and is not limited to this.

For example, the order of priority of padding value candidates such as "00", "55", "AA", and "FF", which are repeated values (identical values), may be set to be higher. Alternatively, the order of priority of padding value candidates may be set in ascending order as "00", "01", "02", and so on. Alternatively, the order of priority of padding value candidates may be set in descending order as "FF", "FE", "FD", and so on.

Then, the communication tool 200 stores a padding value candidate for which no abnormality information has been received from the target unit 310 as a special padding value in the communication tool storage unit 240.

By doing so, the correct padding value can be detected by automatically attempting all padding values, which makes it possible to improve the user's convenience. In addition, if the order of priority of padding value candidates is set in the descending order of being likely to be set as the padding value, it is possible to reduce the number of attempts in automatically attempting all padding values. This makes it possible to improve the user's convenience. In addition, it is possible to reduce the processing load related to communication.

The communication tool 200 then generates the next certain information including the header information, second certain data, and the special padding value stored in the communication tool storage unit 240, and transmits the generated certain information to the target unit 310 to be communicated with.

Thereafter, the communication tool 200 repeats the generation of certain information using the special padding value and the transmission of the generated certain information to the target unit 310 until the transmission of the entire desired communication data is completed.

By doing so, using the special padding value for which abnormality information is no longer received, it is possible to perform the transmission of certain information in the next session and onward, which makes it possible to improve the user's convenience.

Note that, in the case where abnormality information is not received from the target unit 310 from when certain information is first transmitted until a certain period of time elapses, the communication tool 200 determines that the padding value set in the padding value table stored in the communication tool storage unit 240 is correct. In this case, the communication tool 200 will store the above-mentioned first padding value as a special padding value. Hereinafter, a process executed by the communication system 100 will be described.

Figure 4:
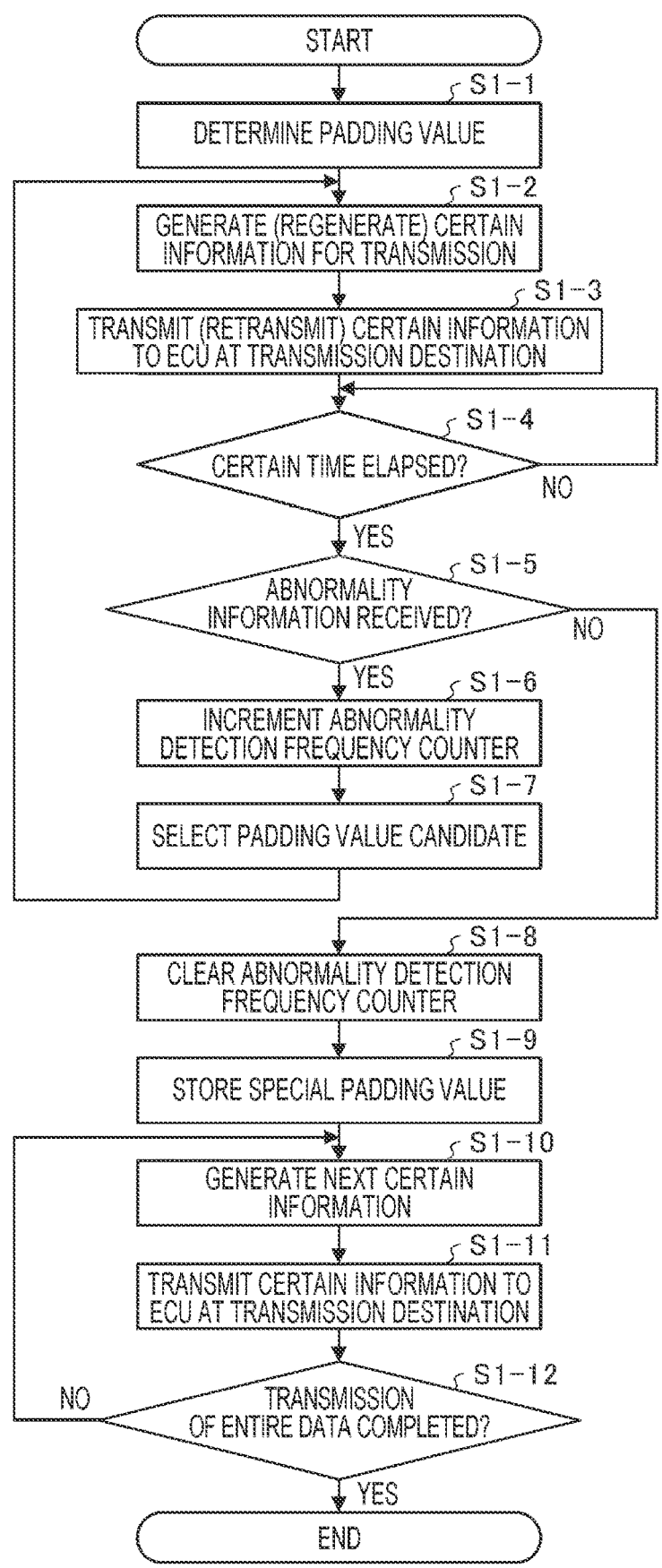
FIG. 4 is a flowchart illustrating a communication-tool-side process according to the embodiment of the disclosure.

FIG. 4 is a flowchart illustrating a communication-tool-side process according to the embodiment of the disclosure. Note that various processes, including one described below, may be executed by the communication tool processor (s) 222 of the communication tool 200. In particular, various processes are executed by the communication tool processor (s) 222 executing a program stored in the communication tool memory (ies) 224 of the communication tool 200.

The communication-tool-side process is executed when the communication tool 200 is coupled to the vehicle 300. In one example, the communication-tool-side process is executed when the communication tool 200 performs transmission of desired communication data to any of the target units 310 in the case of, for example, executing an update of a program of the target unit 310 or conducting a diagnosis of a malfunction. Note that the following describes, as an example, the communication-tool-side process when communication is performed between the communication tool 200 and the ECU-A 310a.

As illustrated in FIG. 4, the communication tool 200 refers to the padding value table stored in the communication tool storage unit 240 to determine the padding value corresponding to the ECU-A 310a to be communicated with (step S1-1). As described above, in the padding value table, a certain first padding value is predetermined for each target unit 310 (ECU-A 310a, ECU-B 310b, and ECU-C 310c).

Next, the communication tool 200 generates certain information for transmission including header information, first certain data, and the first padding value (step S1-2). The first certain data is data that, for desired communication data to be transmitted from the communication tool 200 to the ECU-A 310a, 32 bytes are divided into blocks, each consisting of 8 bytes. The communication tool 200 then executes a padding process to fill the unused space within the last block to be transmitted with the padding value determined in step S1-1 above. In addition, the header information includes total data length information indicating the length of total data and valid data length information indicating the length of valid data.

The communication tool 200 then transmits the certain information generated in step S1-2 above to the ECU-A 310a, which is the target unit 310 to be communicated with (step S1-3).

Moreover, the communication tool 200 waits until a preset certain time elapses after transmitting the certain information (step S1-4).

Then, when the preset certain time elapses after transmitting the certain information (YES in step S1-4), the communication tool 200 determines whether abnormality information indicating that the padding value included in the certain information is incorrect has been received from the ECU-A 310a (step S1-5).

As a result, if the abnormality information has been received (YES in step S1-5), the communication tool 200 increments the value of an abnormality detection frequency counter indicating the number of times the abnormality information has been received (step S1-6).

The communication tool 200 refers to the padding value candidate priority order table illustrated in FIG. 3 to select a padding value candidate based on the value of the abnormality detection frequency counter (step S1-7). For example, the communication tool 200 selects a padding value candidate whose priority is set to 1 if the value of the abnormality detection frequency counter is 1, and selects a padding value candidate whose priority is set to 2 if the value of the abnormality detection frequency counter is 2.

Then, moving to step S1-2, the communication tool 200 regenerates certain information for transmission including the header information, the first certain data, and a second padding value (step S1-2). The communication tool 200 retransmits this regenerated certain information to the ECU-A 310a (step S1-3). At this time, for the second padding value, the padding value candidate selected in step S1-7 above is used.

Then, the communication tool 200 repeatedly executes the processing of steps S1-2 to S1-7 above until abnormality information is no longer received from the ECU-A 310a.

Then, when the preset certain time elapses after transmitting the certain information (YES in step S1-4) and when no abnormality information has been received (NO in step S1-5), the communication tool 200 clears the value of the abnormality detection frequency counter (step S1-8).

In addition, the communication tool 200 stores a padding value candidate for which no abnormality information has been received from the ECU-A 310a as a special padding value in the communication tool storage unit 240 (step S1-9).

The communication tool 200 then uses the special padding value stored in step S1-9 above to generate the next certain information including the header information, the second certain data, and the special padding value (step S1-10).

The communication tool 200 then transmits the certain information generated in step S1-10 above to the ECU-A 310a to be communicated with (step S1-11).

The communication tool 200 then repeatedly executes the processing of steps S1-10 to S1-12 above until the transmission of the entire desired communication data is completed thereafter.

Then, upon completion of the transmission of the entire desired communication data (YES in step S1-12), the communication tool 200 ends the communication-tool-side process.

Figure 5:
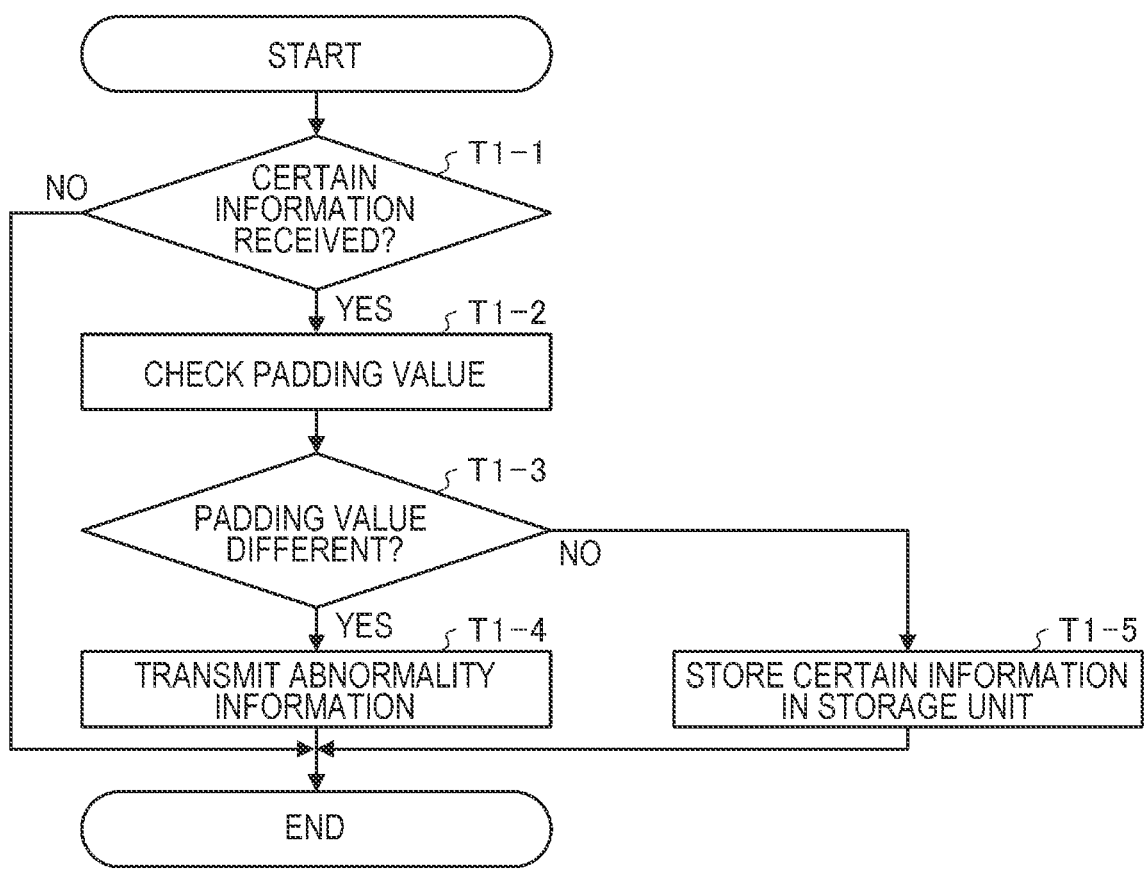
FIG. 5 is a flowchart illustrating a target-unit-side process according to the embodiment of the disclosure.

FIG. 5 is a flowchart illustrating a target-unit-side process according to the embodiment of the disclosure. Note that various processes, including one described below, may be executed by each processor (ECU-A processor (s) 322a, ECU-B processor (s) 322b, and ECU-C processor (s) 322c) of the target units 310 (ECU-A 310a, ECU-B 310b, and ECU-C 310c). In particular, various processes are executed by each processor (ECU-A processor (s) 322a, ECU-B processor (s) 322b, and ECU-C processor (s) 322c) executing a program stored in each memory (ECU-A memory (ies) 324a, ECU-B memory (ies) 324b, and ECU-C memory (ies) 324c). Note that, in the present embodiment, the target-unit-side process is executed in response to an interrupt that occurs every certain time interval.

As illustrated in FIG. 5, the ECU-A 310a determines whether certain information has been received from the communication tool 200 (step T1-1). As a result, if no certain information has been received from the communication tool 200 (NO in step T1-1), the ECU-A 310a ends the target-unit-side process.

If certain information has been received from the communication tool 200 (YES in steps T1-1), the ECU-A 310a checks the padding value included in the received certain information (step T1-2). In one example, the ECU-A 310a refers to the header information included in the certain information to check the total data length information and the valid data length information. The ECU-A 310a then identifies, based on the total data length information and the valid data length information, the padding value included in an area corresponding to the difference between total data and valid data in the received certain information. Alternatively, the ECU-A 310a may regard the last numerical value of the total data as the padding value, and, taking into consideration the continuity of the padding value, may regard data before the location where the padding value is interrupted as valid data. That is, the ECU-A 310a may identify the padding value and the valid data length without using the valid data length information included in the header information.

The ECU-A 310a then determines whether the padding value checked in step T1-2 above is different from the specific padding value stored in the ECU-A storage unit 340a (step T1-3). As a result, if the padding value checked in step T1-2 above is different from the specific padding value stored in the ECU-A storage unit 340a (YES in step T1-3), the ECU-A 310a transmits abnormality information to the communication tool 200 and ends the target-unit-side process.

If the padding value checked in step T1-2 above matches the specific padding value stored in the ECU-A storage unit 340a (NO in step T1-3), the ECU-A 310a stores the certain information received in step T1-1 above in the ECU-A storage unit 340a, and ends the target-unit-side process.

As described above, the communication system 100 of the present embodiment is equipped with the target units 310 (ECU-A 310a, ECU-B 310b, and ECU-C 310c) provided in the vehicle 300, each of which includes one or more target unit processors (ECU-A processor (s) 322a, ECU-B processor (s) 322b, and ECU-C processor (s) 322c) and one or more target unit memories (ECU-A memory (ies) 324a, ECU-B memory (ies) 324b, and ECU-C memory (ies) 324c) coupled to the target unit processor (s) (ECU-A processor (s) 322a, ECU-B processor (s) 322b, and ECU-C processor (s) 322c).

The communication system 100 is also equipped with the communication tool 200 coupled to the target units 310 (ECU-A 310a, ECU-B 310b, and ECU-C 310c) to enable bidirectional communication, which includes one or more communication tool processors 222 and one or more communication tool memories 224 coupled to the communication tool processor (s) 222.

The communication tool processor (s) 222 executes a process including transmitting certain information including the first certain data and the first padding value to the target unit 310 (steps S1-1 to S1-3 in the above-described embodiment, for example).

The target unit processor (s) (ECU-A processor (s) 322a, ECU-B processor (s) 322b, and ECU-C processor (s) 322c) executes a process including determining whether the first padding value included in the received certain information matches a specific padding value that is preset in the target unit 310 (ECU-A 310a, ECU-B 310b, and ECU-C 310c) (step T1-2 and step T1-3 in the above-described embodiment, for example).

If it is determined that the first padding value does not match the specific padding value, the target unit processor (s) (ECU-A processor (s) 322a, ECU-B processor (s) 322b, and ECU-C processor (s) 322c) executes a process including transmitting abnormality information to the communication tool 200 (step T1-4 in the above-described embodiment, for example).

On receipt of the abnormality information, the communication tool processor (s) 222 executes a process including transmitting certain information including the first certain data and a second padding value different from the first padding value to the target unit 310 (ECU-A 310a, ECU-B 310b, and ECU-C 310c) (steps S1-5 to S1-7, and steps S1-2 and S1-3 in the above-described embodiment, for example).

As described above, a discrepancy (inconsistency) in the padding value may occur between the transmission-side communication tool 200 and the receiving-side target unit 310 (ECU-A 310a, ECU-B 310b, and ECU-C 310c) due to differences in design specifications, designers, design timing, etc. In the communication system 100 of the present embodiment as described above, even if such a case occurs, it is possible to reduce the risk of communication being stopped or interrupted. As a result, in the communication system 100 of the present embodiment, it is possible to suppress the risk that the user's convenience will be reduced because a desired function update or a malfunction diagnosis cannot be performed.

The communication tool processor (s) 222 may also execute a process including repeatedly transmitting certain information including the first certain data and any padding value selected from among pre-provided padding value candidates to the target unit 310 until abnormality information is no longer received (steps S1-5 to S1-7 and steps S1-2 and S1-3 in the above-described embodiment, for example).

By doing so, for example, it is possible to automatically attempt all padding values, which makes it possible to improve the user's convenience.

The communication tool processor (s) 222 may also execute a process including selecting any padding value from among the padding value candidates according to a preset order of priority (step S1-7 in the above-described embodiment, for example).

By doing so, for example, if the order of priority of the padding value candidates is set in the descending order of being likely to be set as the padding value, it is possible to reduce the number of attempts in automatically attempting all padding values. This makes it possible for the communication system 100 of the present embodiment to improve the user's convenience. In addition, in the communication system 100 of the present embodiment, it is possible to reduce the processing load related to communication.

The communication tool processor (s) 222 may also execute a process including storing a special padding value for which abnormality information is no longer received in its communication tool storage unit (step S1-9 in the above-described embodiment, for example).

The communication tool processor (s) 222 may also execute a process including transmitting certain information including the second certain data and the special padding value stored in the communication tool storage unit to the target unit 310 (steps S1-10 and S1-11 in the above-described embodiment, for example).

By doing so, using the special padding value for which abnormality information is no longer received, it is possible to perform the transmission of certain information in the next session and onward, which makes it possible to improve the user's convenience.

Although the embodiment of the disclosure has been described above with reference to the accompanying drawings, it goes without saying that the disclosure is not limited to the embodiment. It will be apparent to those skilled in the art that various changes or modifications are conceivable within the scope of the claims, and it is understood that they also fall naturally within the technical scope of the disclosure.

Although the case in which the vehicle 300 is a hybrid-system vehicle has been described in the above-described embodiment, the disclosure is not limited thereto. The disclosure can be applied to various vehicle types, such as gasoline-powered vehicles, electric vehicles (EVs), plug-in hybrid electric vehicles (PHEVs), non-plug-in hybrid vehicles (hybrid vehicles), and the like.

Although the example in which the communication tool 200 is coupled to the vehicle 300 has been discussed in the above-described embodiment, the disclosure is not limited to this example. That is, a unit having the functions of the communication tool 200 discussed in the above-described embodiment may be built into the vehicle 300.

Note that the sequence of processes executed by the communication system 100 according to the above-described embodiment may be realized using software, hardware, or a combination of software and hardware. A program configuring the software is, for example, pre-stored on a non-transitory storage medium provided inside or outside each device. The program is then read from, for example, the non-transitory storage medium (e.g., ROM) to a temporary storage medium (e.g., RAM) and executed by a processor, such as a CPU.

Also, according to the above-described embodiment, a program for executing the processing of each function of the above-described communication system 100 can be provided. Furthermore, a computer-readable non-transitory recording medium on which the program is stored can be provided. The non-transitory recording medium may be, for example, a disc recording medium such as an optical disc, a magnetic disc, a magneto-optical disc, or may be a semiconductor memory such as a flash memory, a Universal Serial Bus (USB) memory, or the like.

According to the disclosure, it is possible to suppress a decrease in convenience.

The communication tool processor (s) 222 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the communication tool processor (s) 222. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 1.

The invention claimed is:

1. A communication system comprising:
a target unit provided in a vehicle, the target unit comprising one or more target unit processors and one or more target unit memories coupled to the one or more target unit processors; and
a communication tool external to the vehicle and coupled to the target unit so as to enable bidirectional communication, the communication tool comprising one or more communication tool processors and one or more communication tool memories coupled to the one or more communication tool processors, wherein:
the one or more communication tool memories store instructions causing the one or more communication tool processors to execute a process including transmitting first certain data and a first padding value to the target unit, the first padding value being added to fill unused space in the transmission of the first certain data;
the one or more target unit memories store instructions causing the one or more target unit processors to execute a process including
determining whether the received first padding value matches a specific padding value preset in the one or more target unit processors, and
generating and transmitting abnormality information to the communication tool in a case where it is determined that the first padding value does not match the specific padding value; and
the one or more communication tool processors are configured to execute a process including,
upon receiving the abnormality information, repeatedly transmitting the first certain data and a padding value selected from padding value candidates provided in advance in a communication tool storage unit to the target unit until the abnormality information is no longer received, each selected padding value being different from the first padding value and any of one or more padding values transmitted to the target unit after the first padding value was transmitted, each selected padding value being added to fill the unused space in the transmission of the first certain data;
storing a padding value candidate for which no abnormality information has been received as a special padding value in the communication tool storage unit, and
transmitting second certain data and the special padding value to the target unit.

2. The communication system according to claim 1, wherein the one or more communication tool processors are configured to execute a process including selecting the padding value from among the padding value candidates according to a preset order of priority.

3. The communication system according to claim 2, wherein the first certain data is transmitted to update a function of the vehicle.

4. The communication system according to claim 2, wherein the first certain data is transmitted to diagnose a malfunction of the vehicle.

5. The communication system according to claim 1, wherein the first certain data is transmitted to update a function of the vehicle.

6. The communication system according to claim 1, wherein the first certain data is transmitted to diagnose a malfunction of the vehicle.

7. A communication tool comprising:

one or more processors configured to communicate with a target unit provided in a vehicle, wherein the target unit is configured (i) to receive data from the one or more processors, (ii) determine whether a padding value added to the received data from the one or more processors matches a preset specific padding value; and (iii) to generate and transmit abnormality information to the one or more processors in a case where the padding value added to the received data from the one or more processors does not match a preset specific padding value;

a storage coupled to the one or more processors; and one or more memories coupled to the one or more processors and configured to store instructions causing the one or more processors to:

transmit a first certain data and a first padding value to the target unit, the first padding value being added to fill unused space in the transmission of the first certain data;

upon receiving the abnormality information from the target unit, repeatedly execute a process of transmitting the first certain data and a padding value to the target unit until the abnormality information is no longer received, each of the padding value being selected from padding value candidates provided in advance in the storage, each of the padding value being added to fill the unused space in the transmission of the first certain data, each of the padding value being different from the first padding value and any of one or more padding values that transmitted to the target unit after the first padding value was transmitted;

store a padding value candidate for which no abnormality information has been received as a special padding value in the storage, and transmit second certain data and the special padding value stored in the storage to the target unit.

8. The communication tool accordingly to claim 7, wherein the one or more processors are further configured to:

select one of the padding value candidates according to a preset order of priority.

9. The communication tool accordingly to claim 7, wherein the first certain data is transmitted to update a function of the vehicle.

10. The communication tool accordingly to claim 7, wherein the first certain data is transmitted to diagnose a malfunction of the vehicle.

* * * * *